(12) United States Patent
Hirao

(10) Patent No.: US 10,361,611 B2
(45) Date of Patent: Jul. 23, 2019

(54) COIL END BENDING JIG

(71) Applicant: TOYOTA JIDOSHA KABUSHIKI KAISHA, Toyota-shi (JP)

(72) Inventor: Yasuyuki Hirao, Okazaki (JP)

(73) Assignee: TOYOTA JIDOSHA KABUSIKI KAISHA, Toyota-shi (JP)

( * ) Notice: Subject to any disclaimer, the term of this patent is extended or adjusted under 35 U.S.C. 154(b) by 190 days.

(21) Appl. No.: 15/298,343

(22) Filed: Oct. 20, 2016

(65) Prior Publication Data

US 2017/0117780 A1 Apr. 27, 2017

(30) Foreign Application Priority Data

Oct. 22, 2015 (JP) ................. 2015-208323

(51) Int. Cl.
*H02K 15/00* (2006.01)
*H02K 15/085* (2006.01)

(52) U.S. Cl.
CPC ..... *H02K 15/0031* (2013.01); *H02K 15/0037* (2013.01); *H02K 15/0087* (2013.01); *H02K 15/085* (2013.01)

(58) Field of Classification Search
CPC .... H02K 15/06; H02K 15/062; H02K 15/067; H02K 15/0031; H02K 15/0037; H02K 15/0087; H02K 15/085
See application file for complete search history.

(56) References Cited

U.S. PATENT DOCUMENTS

| 5,113,573 A | * | 5/1992 | Taji | .................. | H02K 15/0485 |
| | | | | | 29/596 |
| 5,786,651 A | * | 7/1998 | Suzuki | .................. | B21K 25/00 |
| | | | | | 310/216.009 |
| 2015/0180319 A1 | | 6/2015 | Kimura et al. | | |

FOREIGN PATENT DOCUMENTS

| JP | 03047064 B | * | 7/1991 |
| JP | 2004-236375 A | | 8/2004 |
| JP | 2004-320848 A | | 11/2004 |
| JP | 2014-180128 A | | 9/2014 |
| JP | 5782566 B2 | | 7/2015 |

* cited by examiner

*Primary Examiner* — Carl J Arbes
(74) *Attorney, Agent, or Firm* — Oblon, McClelland, Maier & Neustadt, L.L.P.

(57) ABSTRACT

A coil end bending jig pushes down a plurality of coil ends of coil segments held by a toric stator core, the plurality of coil ends being arranged on a same circumference. The coil end bending jig includes a plurality of bending units each having a bending tooth that makes contact with a corresponding one of the coil ends, and a guide member having a plurality of guiding slits into which the plurality of bending units is inserted, respectively. The plurality of guiding slits extends from an inner peripheral side of the stator core to an outer peripheral side of the stator core so as not to intersect with each other when viewed from an axial direction of the stator core.

7 Claims, 18 Drawing Sheets

COIL END BENDING JIG

INCORPORATION BY REFERENCE

The disclosure of Japanese Patent Application No. 2015-208323 filed on Oct. 22, 2015 including the specification, drawings and abstract is incorporated herein by reference in its entirety.

BACKGROUND

1. Field

The present disclosure relates to a coil end bending jig and a coil end bending method.

2. Description of Related Art

Japanese Patent Application Publication No. 2004-236375 (JP 2004-236375 A) describes a technique in which a plurality of coil ends inserted into slots of a stator core and arranged on the same circumference is pushed down in a circumferential direction so that the coil ends are bent. More specifically, a twisting jig is brought into contact with top ends of the plurality of coil ends and the twisting jig is rotated and moved up and down so as to push down the plurality of coil ends in the circumferential direction. The twisting jig has projection portions each configured to be inserted between two coil ends adjacent to each other in the circumferential direction.

In JP 2004-236375 A, the plurality of coil ends is arranged on the same circumference at a narrow pitch. Therefore, at the time when the projection portion of the twisting jig is inserted between two adjacent coil ends and pushes down one of the adjacent coil ends, the projection portion might physically interfere with the other coil end to be pushed down along the same orientation.

BRIEF SUMMARY

The present disclosure provides a technique that restrains unexpected physical interference between a jig and coil ends at the time when the coil ends are pushed down.

A first aspect of the present disclosure relates to a coil end bending jig including: a plurality of bending units each having a bending tooth making contact with a corresponding one of a plurality of coil ends of a plurality of coil segments held by a toric stator core, the plurality of coil ends being arranged on the same circumference; and a guide member having a plurality of guide slits into which the plurality of bending units is inserted, respectively, the plurality of guide slits extending from an inner peripheral side of the stator core to an outer peripheral side of the stator core so as not to intersect with each other when viewed from an axial direction of the stator core. According to the first aspect, at the time when the plurality of coil ends arranged on the same circumference is pushed down, the bending units push down the coil ends along the guiding slits that do not intersect with each other. This accordingly makes it possible to restrain unexpected physical interference between the jig and the coil ends. In the first aspect, the guiding slits may extend linearly when viewed from the axial direction of the stator core. In the first aspect, the guiding slits may extend along a tangential direction with respect to a circle on which the plurality of coil ends is arranged, when viewed from the axial direction of the stator core. A second aspect of the present disclosure relates to a coil end bending method of pushing down the plurality of coil ends of the coil segments held by the toric stator core in a circumferential direction by use of the coil end bending jig, the plurality of coil ends being arranged on the same circumference. The coil end bending method includes: pushing down the plurality of coil ends toward an outer peripheral side of the stator core; and pushing the plurality of coil ends toward an inner peripheral side of the stator core so that the plurality of coil ends pushed down toward the outer peripheral side of the stator core is along a circumference direction of the stator core. According to the second aspect, at the time when the plurality of coil ends held by the toric stator core and arranged on the same circumference is pushed down in the circumferential direction, it is possible to restrain unexpected physical interference between the jig and the coil ends. Further, in the second aspect, a restraint member may be inserted in advance on an inner peripheral side of the stator core relative to the plurality of coil ends before pushing the plurality of coil ends toward the inner peripheral side of the stator core, so that an outer peripheral surface of the restraint member is opposed to the plurality of coil ends in a radial direction of the stator core and a central axis of the restraint member accords with a central axis of the stator core, the restraint member having a round-shaped outer peripheral portion in a section perpendicular to the axial direction of the stator core. When the plurality of coil ends is pushed toward the inner peripheral side of the stator core, the plurality of coil ends may be pressed against the outer peripheral surface of the restraint member. According to the above method, when the plurality of coil ends is pushed toward the inner peripheral side of the stator core, it is possible to reduce such a possibility that the plurality of coil ends is excessively pushed toward the inner peripheral side of the stator core.

The present disclosure makes it possible to restrain unexpected physical interference between the jig and the coil ends at the time when the plurality of coil ends arranged on the same circumference is pushed down.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
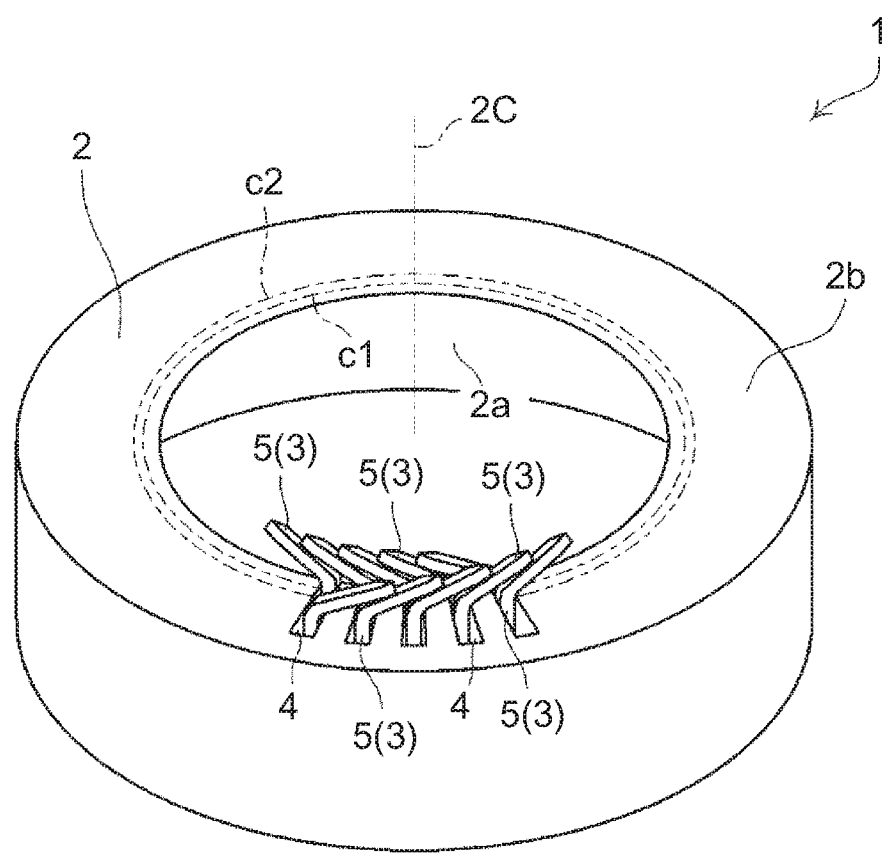
FIG. 1 is a perspective view of a stator.

FIG. 1 illustrates a perspective view of a stator 1. As illustrated in FIG. 1, the stator 1 includes a stator core 2, and a plurality of coil segments 3 having ends that are bent. The stator core 2 is configured such that a plurality of toric electromagnetic steel sheets is laminated. A plurality of coil slots 4 is formed on an inner peripheral surface 2a of the stator core 2 such that the plurality of coil slots 4 penetrates through the inner peripheral surface 2a in an axial direction of the stator core 2. Eight coil segments 3, for example, are inserted into one coil slot 4 such that the coil segments 3 are arranged in a radial direction of the stator core 2. FIG. 1 illustrates a state where two coil segments 3 are inserted into one coil slot 4 for convenience of the description.

Hereinafter, in the present specification: when a radial direction is just referred to, it indicates the radial direction of the stator core 2; when an axial direction is just referred to, it indicates the axial direction of the stator core 2; when an inner peripheral side is referred to, it indicates an inner peripheral side of the stator core 2; when an outer peripheral side is referred to, it indicates an outer peripheral side of the stator core 2; and when a circumferential direction is referred to, it indicates a circumferential direction of the stator core 2.

An exposed part of the coil segment 3 from the coil slot 4 is called a coil end 5. The coil end 5 projects from an end surface 2b in the axial direction of the stator core 2. A plurality of coil segments 3 constitutes a coil such that respective coil ends 5 of the plurality of coil segments 3 are electrically connected to each other by welding or the like.

As illustrated in FIG. 1, a plurality of coil ends 5 is arranged in a layered manner from the inner peripheral side toward the outer peripheral side. That is, a plurality of coil ends 5 is arranged on a circle c1 corresponding to a first round counted from the inner peripheral side such that the plurality of coil ends 5 is leaned in the circumferential direction so as to overlap each other. Another plurality of coil ends 5 is arranged on a circle c2 corresponding to a second round counted from the inner peripheral side such that the plurality of coil ends 5 is leaned in the circumferential direction so as to overlap each other. The same can apply to a third round, a fourth round, a fifth round, a sixth round, a seventh round, and an eighth round. Accordingly, when the plurality of coil ends 5 arranged on the circle c1 corresponding to the first round counted from the inner peripheral side is focused, the plurality of coil ends 5 is held by the toric stator core 2 so as to be arranged on the same circumference (the circle c1).

Further, the plurality of coil ends 5 is all pushed down at a predetermined angle in the circumferential direction so as to extend along the circumferential direction. More specifically, the plurality of coil ends 5 arranged on the circle c1 corresponding to the first round counted from the inner peripheral side is pushed down clockwise. The plurality of coil ends 5 arranged on the circle c2 corresponding to the second round counted from the inner peripheral side is pushed down counterclockwise. As such, a plurality of coil ends 5 arranged on a circle of an odd number counted from the inner peripheral side is pushed down clockwise, while a plurality of coil ends 5 arranged on a circle of an even number counted from the inner peripheral side is pushed down counterclockwise.

With reference to FIGS. 2 to 19, the following describes a bending method of the coil ends 5 such that the plurality of coil ends 5 held by the stator core 2 and arranged on the same circumference is pushed down in the circumferential direction.

Figure 2:
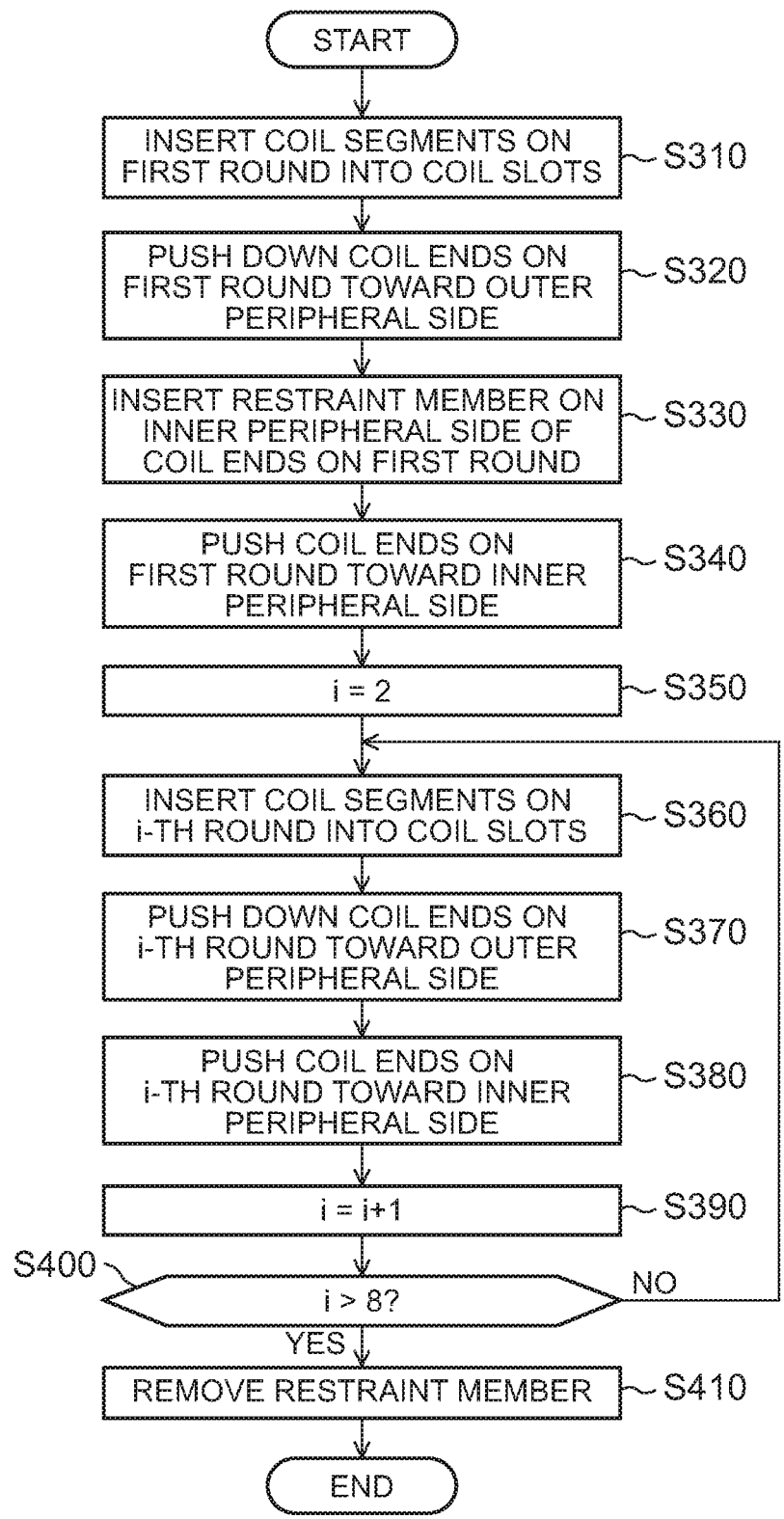
FIG. 2 is a flowchart of a bending method of coil ends.
Figure 3:
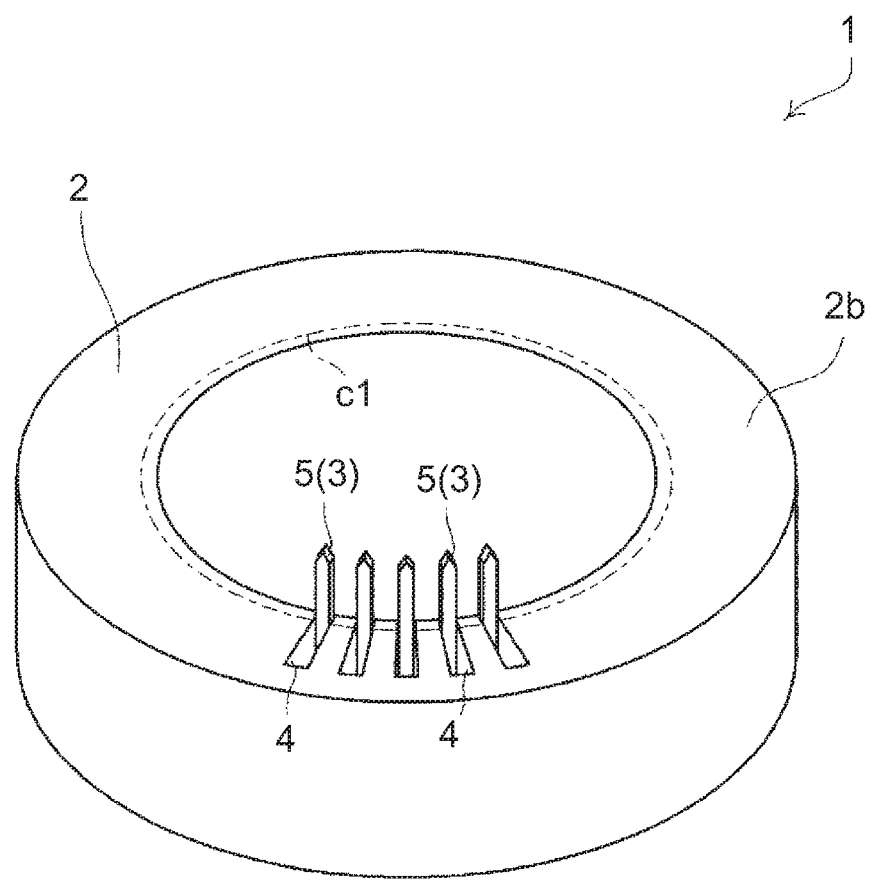
FIG. 3 is a perspective view of a stator.

FIG. 2 illustrates a flowchart of the bending method of the coil ends 5. First, as illustrated in FIG. 3, a plurality of coil segments 3 on the first round counted from the inner peripheral side is inserted into the coil slot 4 of the stator core 2 (S310). Coil ends 5 of the plurality of coil segments 3 project from the coil slots 4 in a direction to be distanced from the end surface 2b of the stator core 2 and are arranged on the same circumference (the circle c1). The coil ends 5 of the plurality of coil segments 3 all extend in parallel with the axial direction of the stator core 2.

Then, the plurality of coil segments 3 on the first round is pushed down toward the outer peripheral side (S320). The following describes details of step S320.

Figure 4:
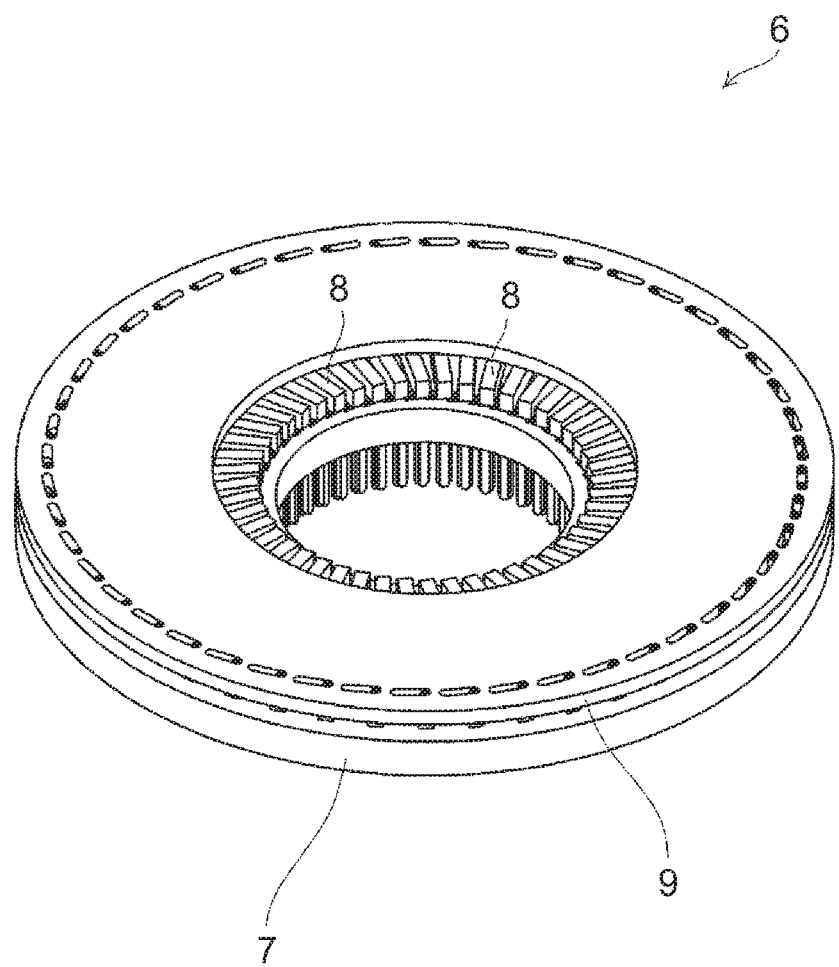
FIG. 4 is a perspective view of a coil end bending jig.
Figure 5:
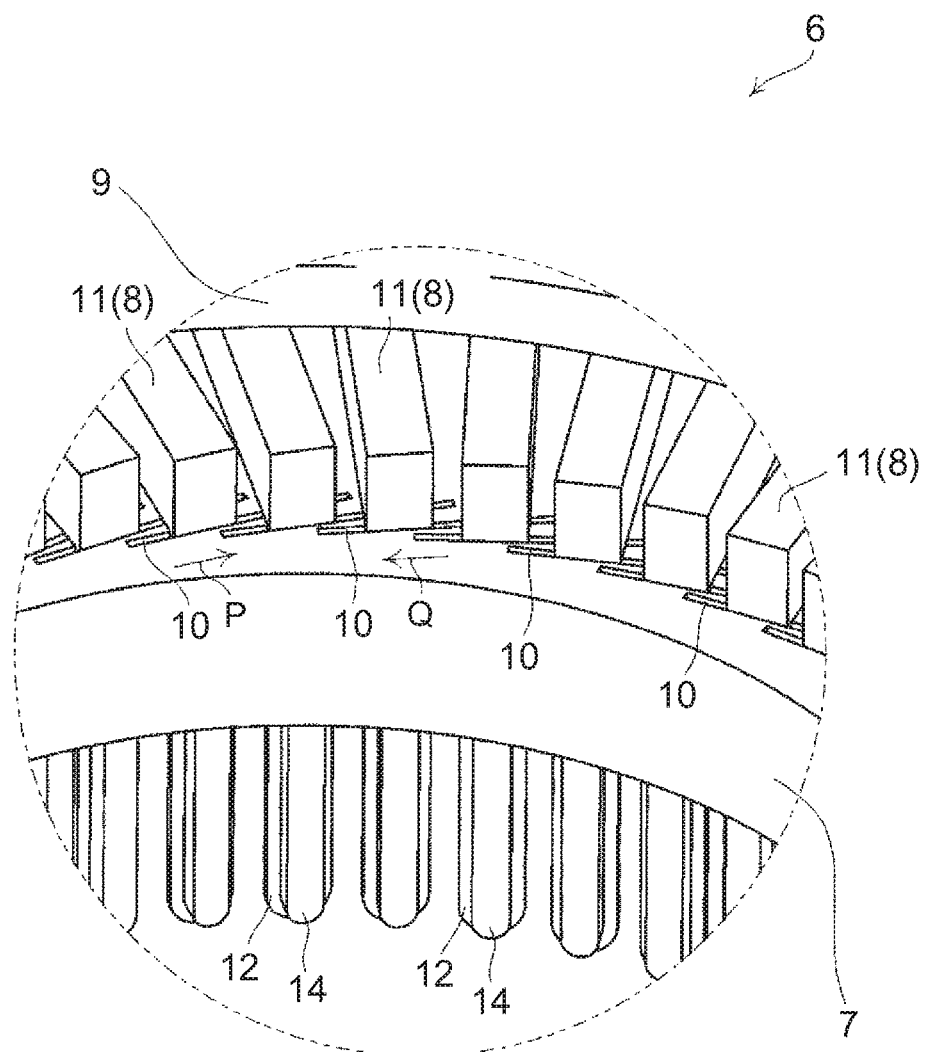
FIG. 5 is a partial enlarged perspective view of the coil end bending jig.

With reference to FIGS. 4 to 9, the following first describes a coil end bending jig 6 for pushing down the plurality of coil ends 5 on the first round toward the outer peripheral side. As illustrated in FIGS. 4 and 5, the coil end bending jig 6 includes a guide plate 7 (a guide member), a plurality of bending units 8, and a drive plate 9. The plurality of bending units 8 is driven by the drive plate 9.

Figure 6:
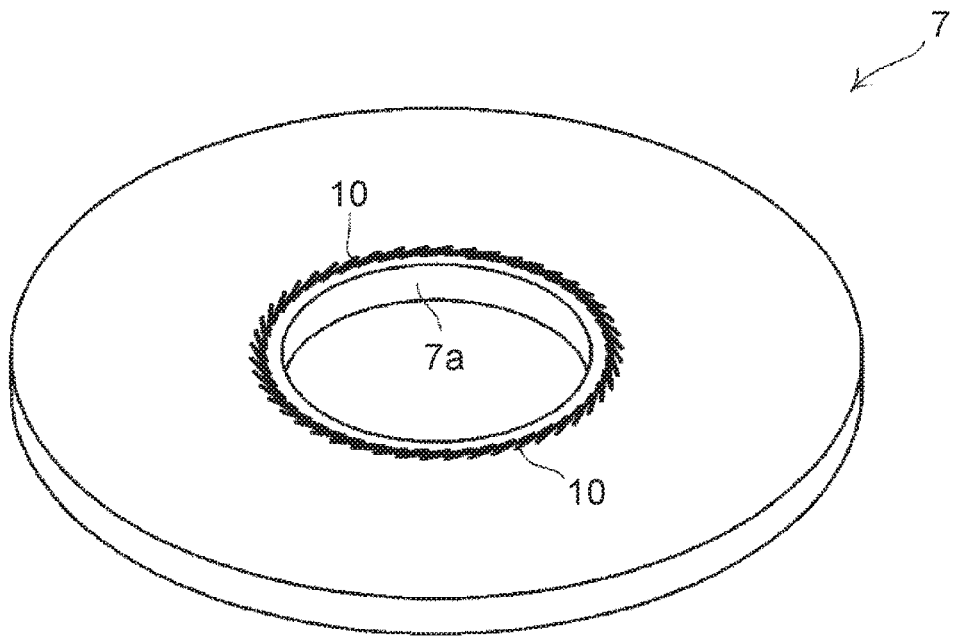
FIG. 6 is a perspective view of a guide plate.
Figure 7:
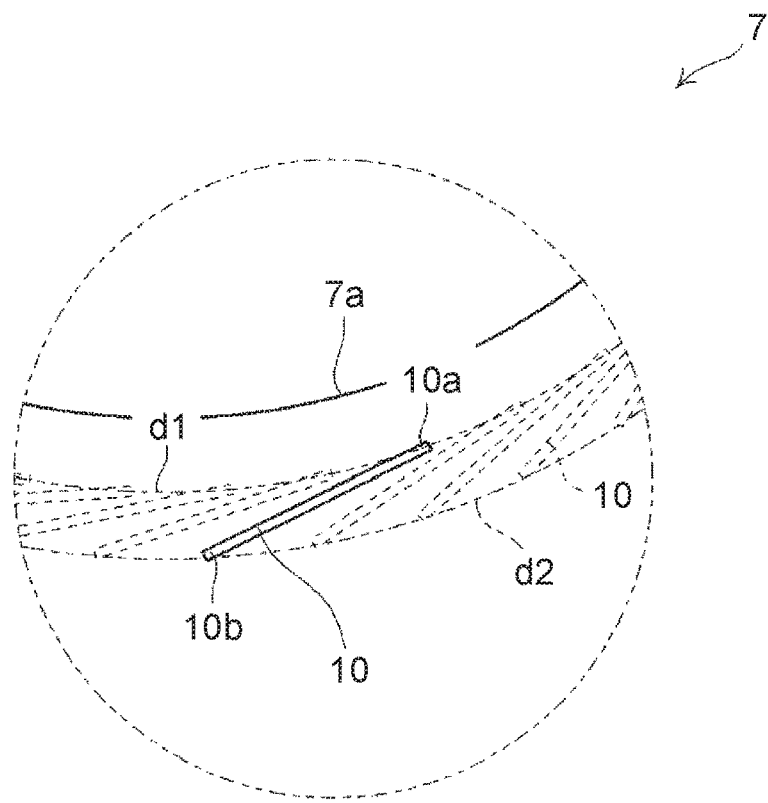
FIG. 7 is a partial enlarged plan view illustrating the guide plate.

As illustrated in FIG. 6, the guide plate 7 is formed in a discoid shape having a through-hole 7a in its center. The guide plate 7 has a plurality of guiding slits 10. The plurality of guiding slits 10 is formed in the vicinity of the through-hole 7a. The plurality of guiding slits 10 is placed on the same circumference at a predetermined pitch. In FIG. 7, one guiding slit 10 among the plurality of guiding slits 10 is illustrated by a continuous line, and the other guiding slits 10 are illustrated by broken lines. FIG. 7 illustrates a plan view of the guide plate 7 when viewed from the axial direction of the stator core 2. The guiding slits 10 are formed so as to extend linearly. Accordingly, it is possible to easily provide the guiding slits 10 on the guide plate 7. The guiding slits 10 are formed so as to be inclined with respect to the circumferential direction. Each of the guiding slits 10 has an inner end 10a and an outer end 10b. The outer end 10b is placed on an outer peripheral side of the guide plate 7 relative to the inner end 10a. The outer end 10b is placed in a clockwise direction when viewed from the inner end 10a. Respective inner ends 10a of the guiding slits 10 are placed on the same circumference (a circle d1). Similarly, respective outer ends 10b of the guiding slits 10 are also placed on the same circumference (a circle d2). When viewed from the axial direction of the stator core 2, the guiding slits 10 extend along a tangential direction with respect to the circle c1 (also see FIG. 1). Accordingly, it is possible to easily provide the plurality of guiding slits 10 on the guide plate 7 at a small interval.

Figure 8:
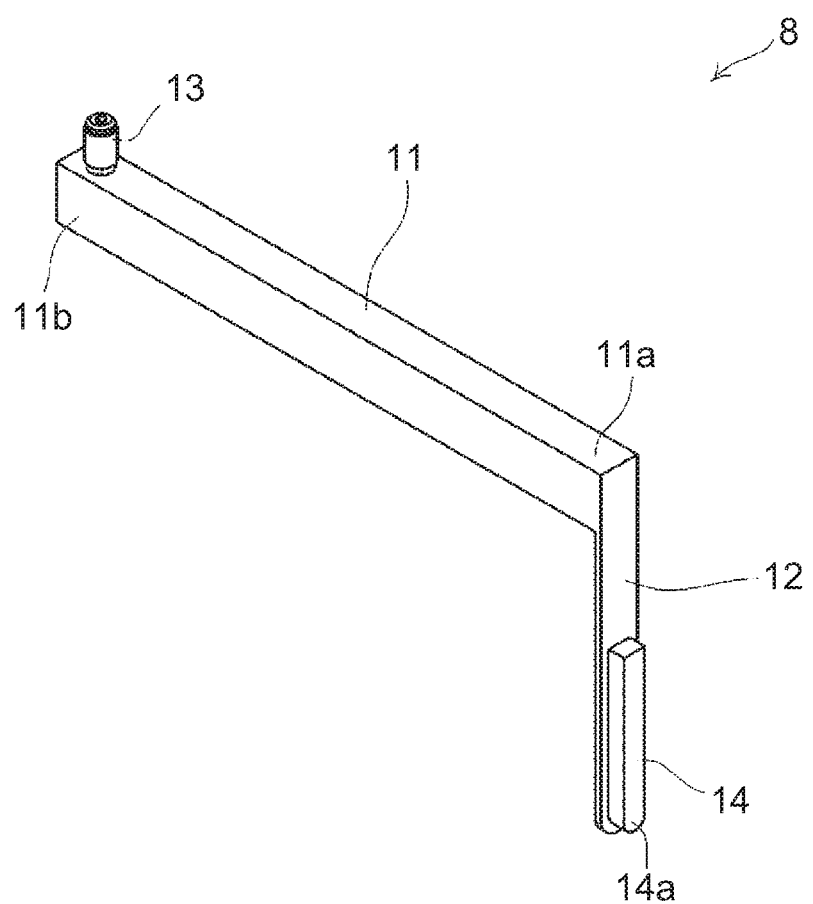
FIG. 8 is a perspective view of a bending unit.

FIG. 8 illustrates a perspective view of the bending unit 8. The bending unit 8 includes a driving beam 11, a holding beam 12, a cam follower 13, and a bending tooth 14.

The driving beam 11 extends in a direction perpendicular to the axial direction. The holding beam 12 extends downward from an end portion 11a of the driving beam 11. The cam follower 13 projects upward from an end portion 11b of the driving beam 11. The bending tooth 14 is held by the holding beam 12 so that the bending tooth 14 projects toward the inner peripheral side from the holding beam 12. The bending tooth 14 is formed in an elongated shape in an up-down direction.

Figure 9:
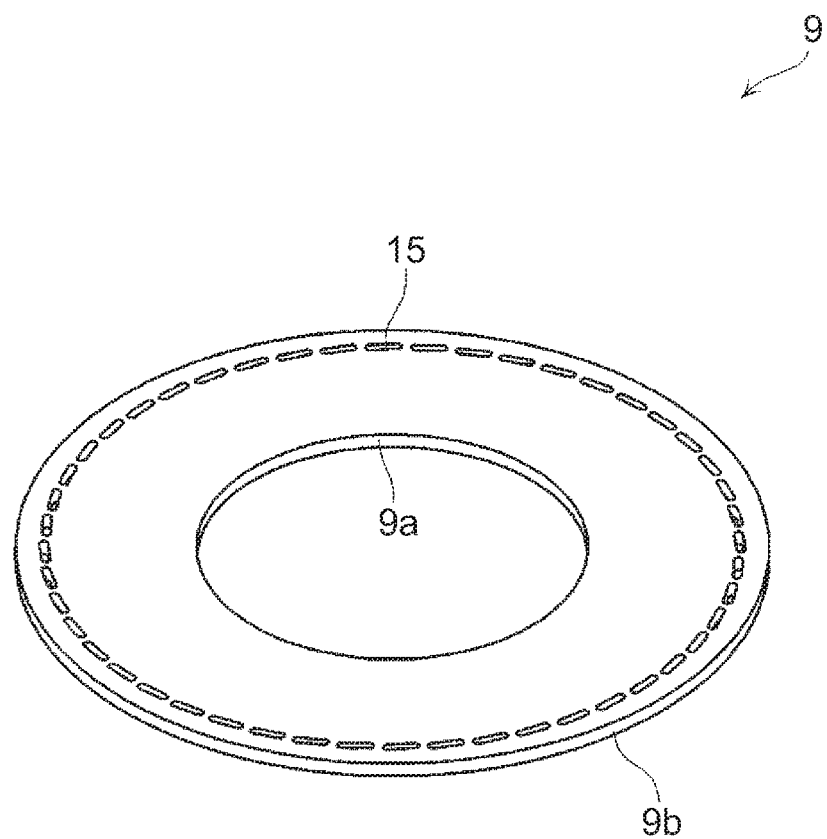
FIG. 9 is a perspective view of a drive plate.

As illustrated in FIG. 9, the drive plate 9 is formed in a discoid shape having a through-hole 9a in its center. The drive plate 9 has a plurality of driving slits 15. The plurality of driving slits 15 is formed so as to be arranged on the same circumference. The plurality of driving slits 15 is formed in the vicinity of an outer peripheral surface 9b of the drive plate 9.

Referring back to FIG. 5, in order to assemble the coil end bending jig 6, the holding beams 12 of the plurality of bending units 8 are first inserted into the plurality of guiding slits 10 of the guide plate 7, respectively. At this time, if the bending tooth 14 is attached to the holding beam 12, the holding beam 12 cannot be inserted into the guiding slit 10. In view of this, the holding beam 12 is inserted into the guiding slit 10 before the bending tooth 14 is attached to the holding beam 12, and after the insertion, the bending tooth 14 is attached to the holding beam 12 by bolt fastening or the like, for example.

Then, the drive plate 9 is opposed to the guide plate 7 so that the driving beams 11 of the plurality of bending units 8 are sandwiched between the guide plate 7 and the drive plate 9 in the up-down direction. At this time, respective cam followers 13 of the bending units 8 illustrated in FIG. 8 are inserted into respective driving slits 15 of the drive plate 9 illustrated in FIG. 9.

According to the above configuration, in FIG. 5, when the drive plate 9 is rotated clockwise relative to the guide plate 7, the bending teeth 14 move along respective guiding slits 10 as indicated by an arrow P. Similarly, when the drive plate 9 is rotated counterclockwise relative to the guide plate 7, the bending teeth 14 move along respective guiding slits 10 as indicated by an arrow Q.

Subsequently, referring to FIGS. 10 to 18, the following describes a step (S320) of pushing down the plurality of coil ends 5 on the first round toward the outer peripheral side by use of the coil end bending jig 6.

Figure 10:
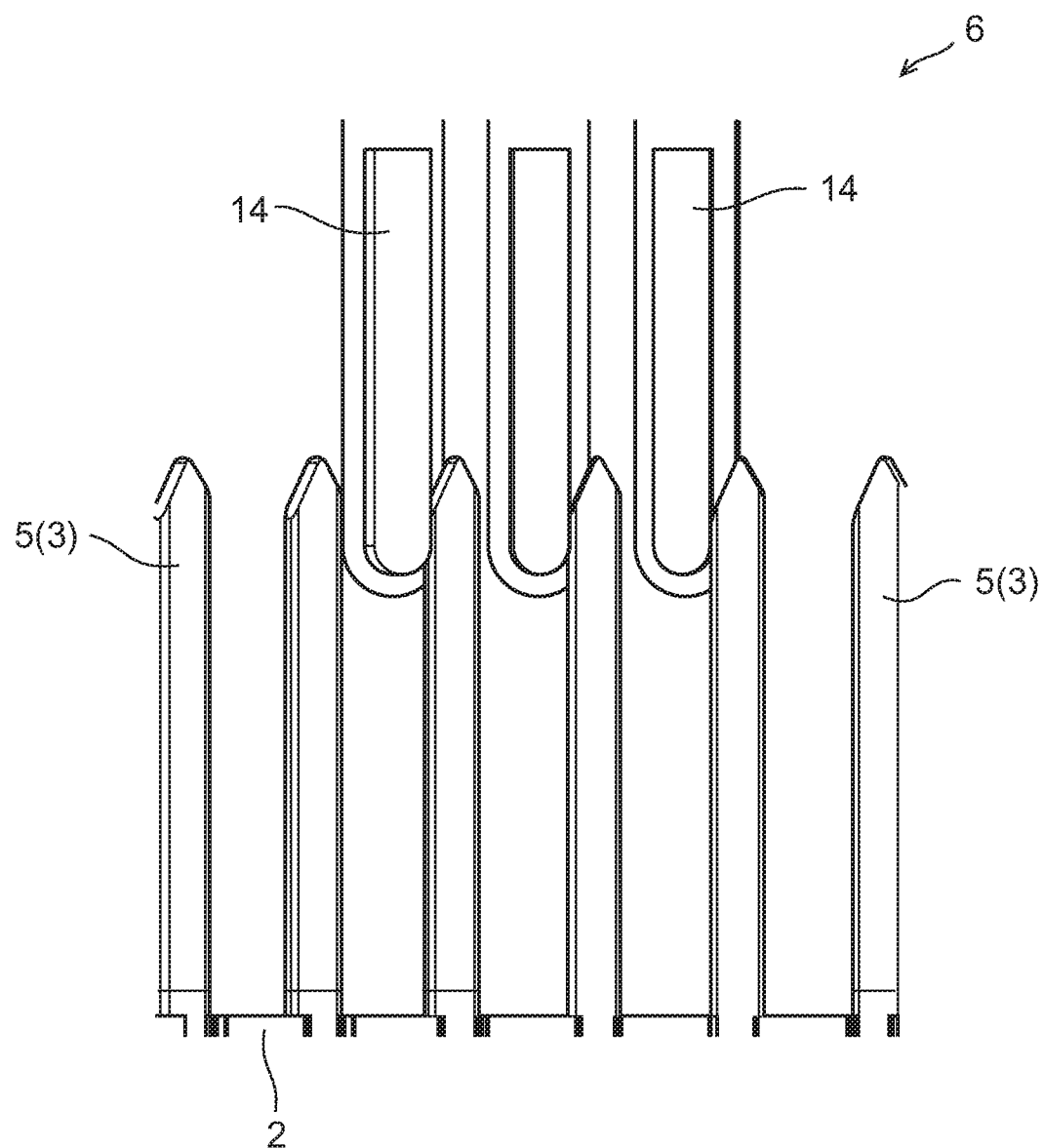
FIG. 10 is a front view illustrating a state where the coil ends are bent.
Figure 11:
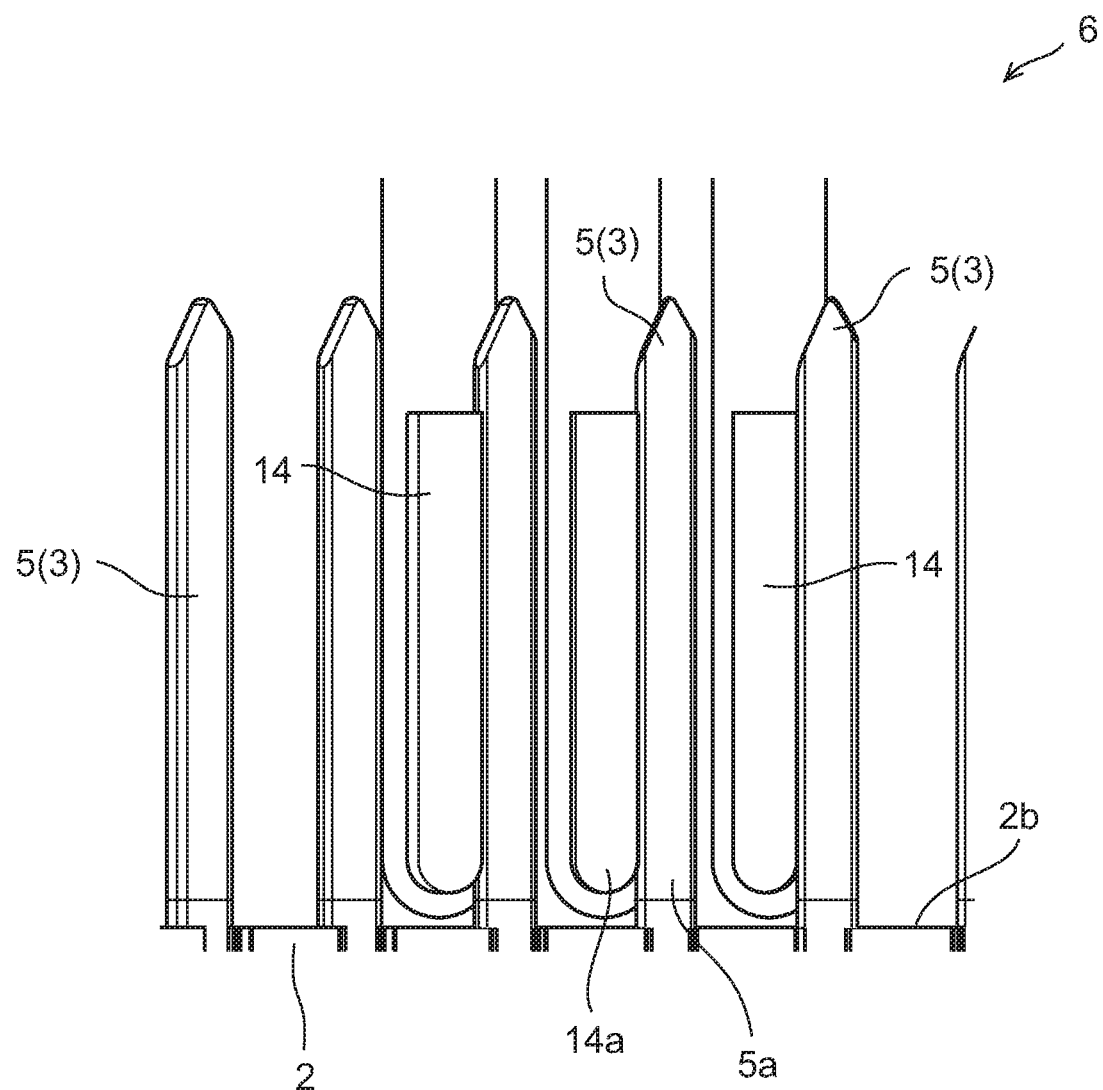
FIG. 11 is a front view illustrating a state where the coil ends are bent.

First, as illustrated in FIGS. 10 and 11, the coil end bending jig 6 is moved down so that a plurality of bending teeth 14 of the coil end bending jig 6 is inserted between the plurality of coil ends 5 of the stator 1. Hereby, as illustrated in FIG. 11, lower ends 14a of the bending teeth 14 are opposed to their corresponding bases 5a of the coil ends 5 in the circumferential direction. Further, the lower ends 14a of the bending teeth 14 are hereby opposed to the end surface 2b in the axial direction of the stator core 2.

Figure 12:
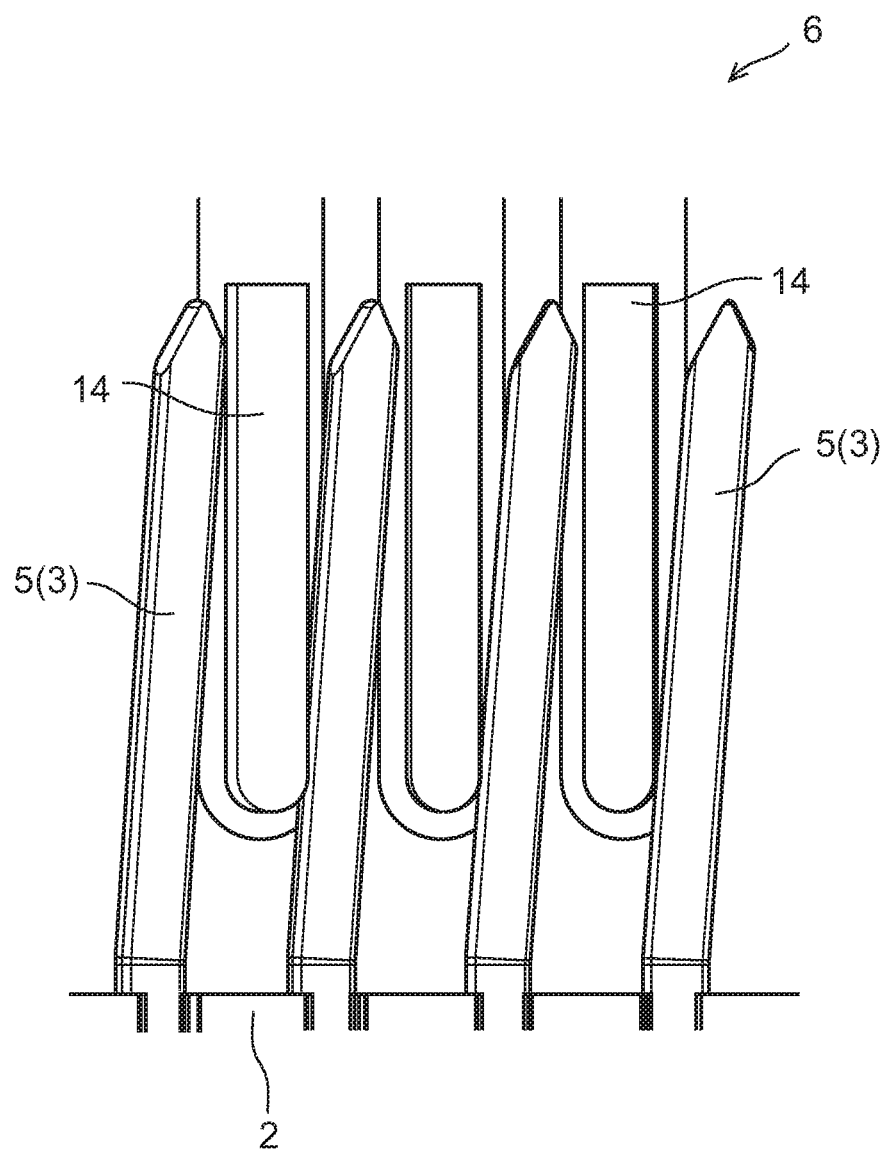
FIG. 12 is a front view illustrating a state where the coil ends are bent.
Figure 13:
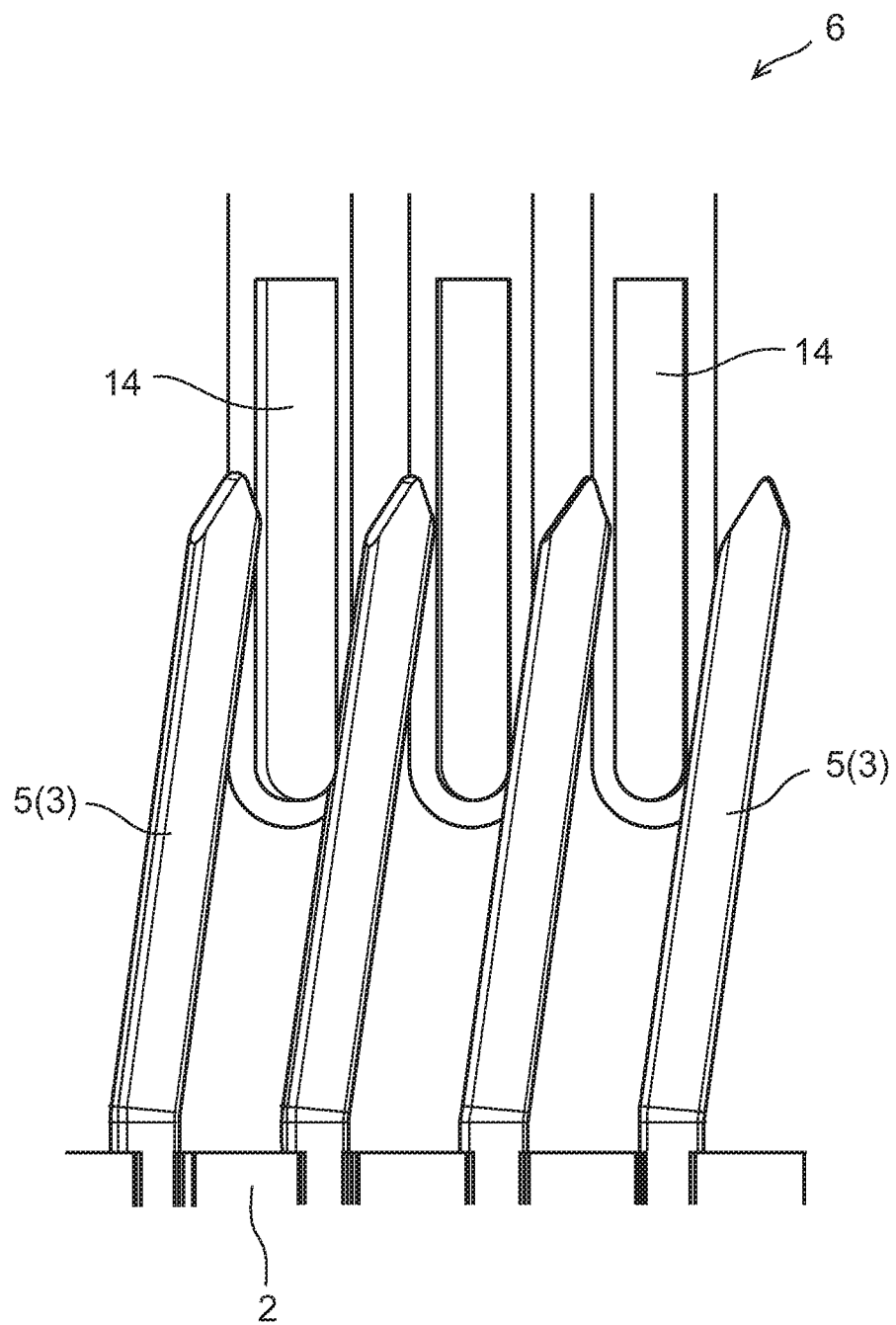
FIG. 13 is a front view illustrating a state where the coil ends are bent.
Figure 14:
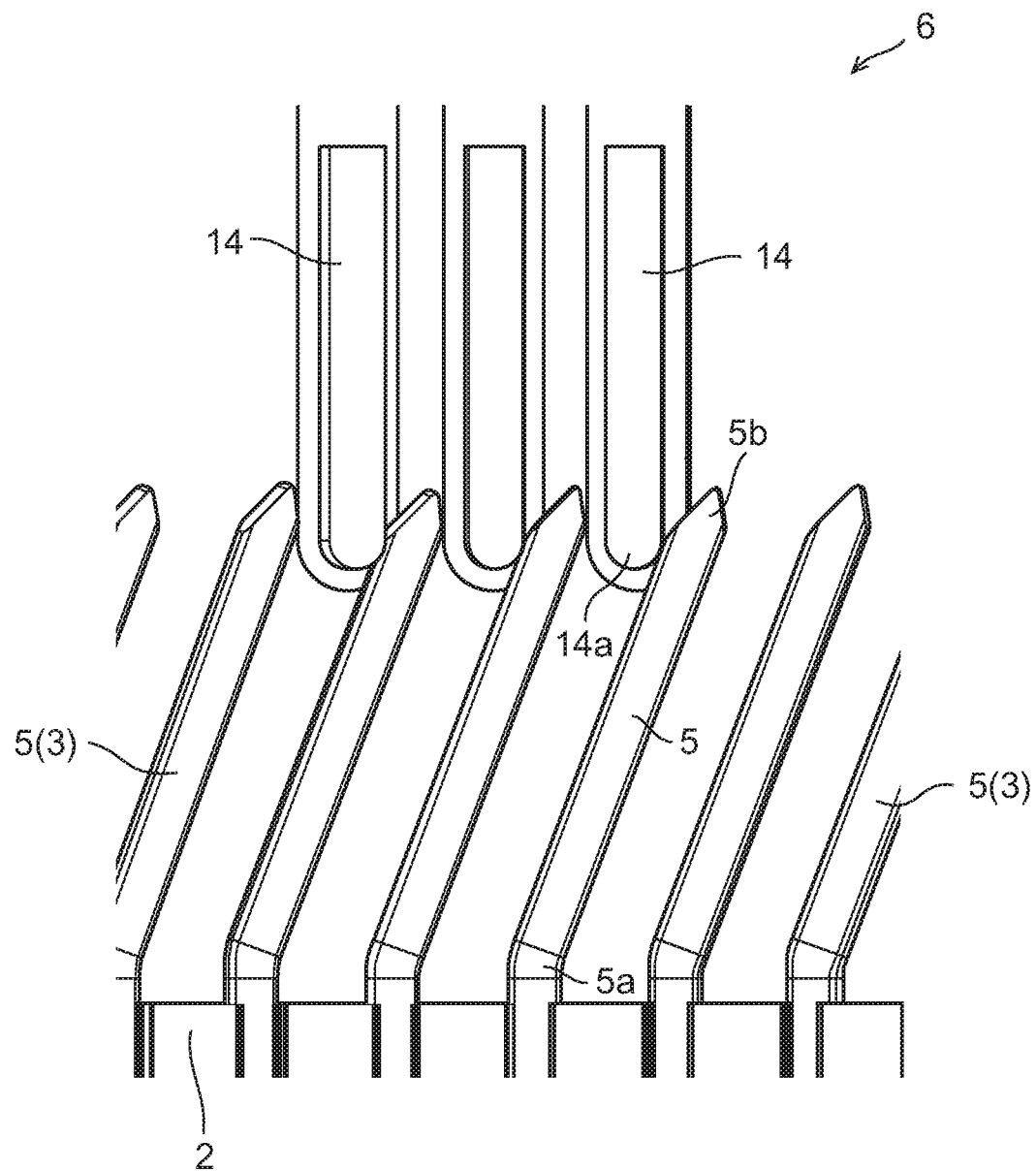
FIG. 14 is a front view illustrating a state where the coil ends are bent.

Subsequently, as illustrated in FIGS. 12 to 14, the drive plate 9 is rotated clockwise relative to the guide plate 7 with the coil end bending jig 6 being gradually moved up. Hereby, the bending teeth 14 push down the coil ends 5 while the bending teeth 14 slip over the coil ends 5.

Figure 15:
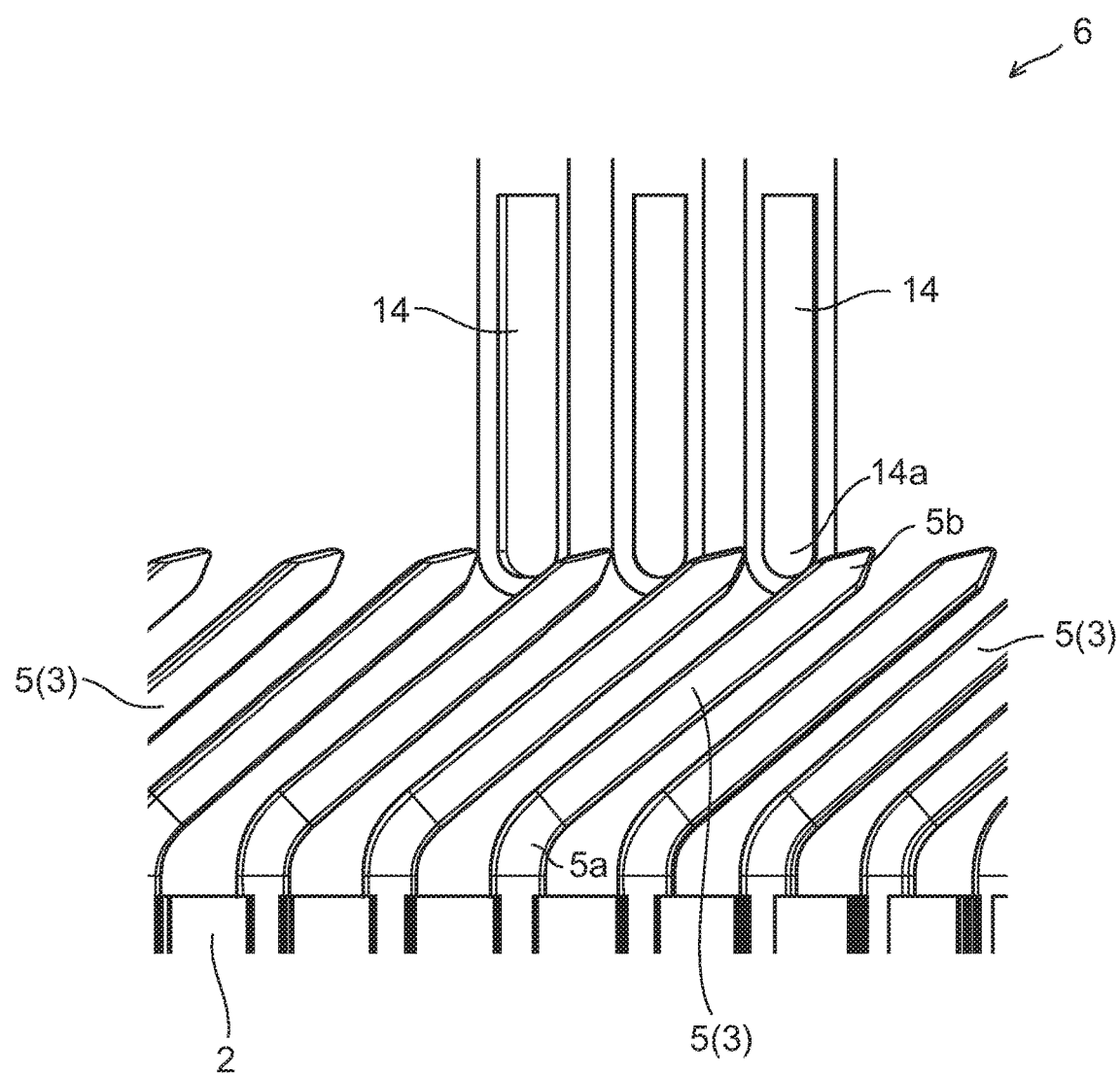
FIG. 15 is a front view illustrating a state where the coil ends are bent.
Figure 16:
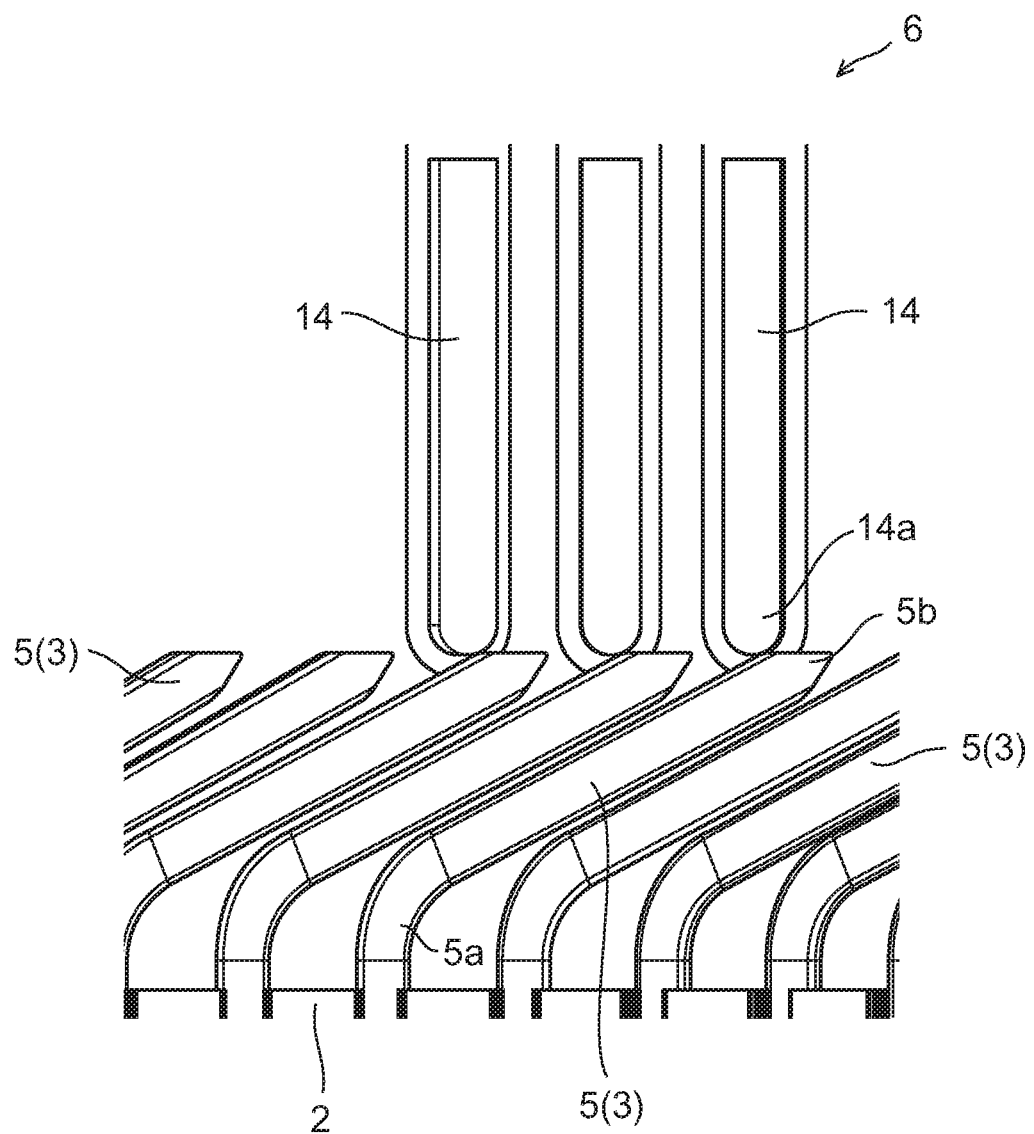
FIG. 16 is a front view illustrating a state where the coil ends are bent.

Then, when the lower ends 14a of the bending teeth 14 come near the top ends 5b of the coil ends 5 as illustrated in FIG. 14, the drive plate 9 is rotated clockwise relative to the guide plate 7 with the coil end bending jig 6 being gradually moved down as illustrated in FIGS. 14 to 16. Hereby, the plurality of coil ends 5 on the first round is pushed down in the clockwise direction.

Then, the coil end bending jig 6 is moved up so as to be separated from the stator 1 and the drive plate 9 is rotated counterclockwise relative to the guide plate 7, so that the bending teeth 14 are returned to the inner ends 10a (also see FIG. 7) of the guiding slits 10.

Figure 17:
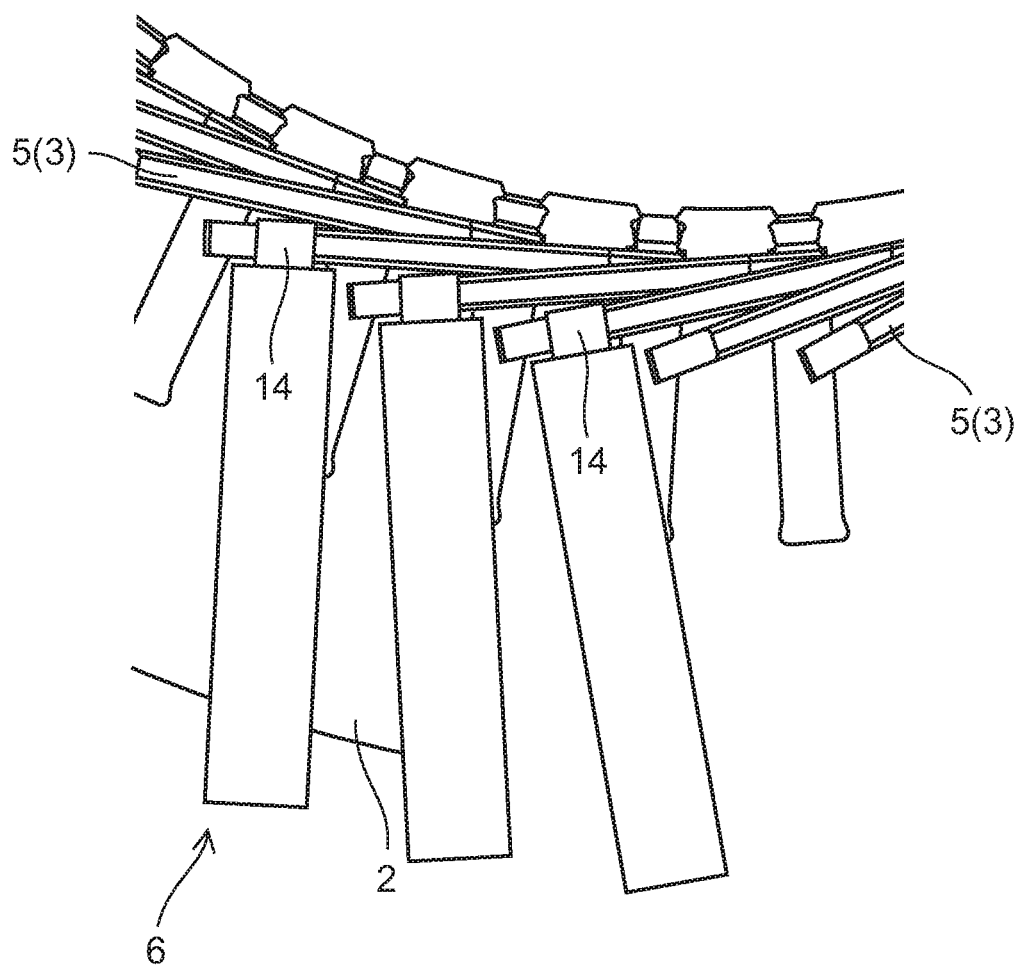
FIG. 17 is a plan view of the coil ends pushed down in a tangential direction.
Figure 18:
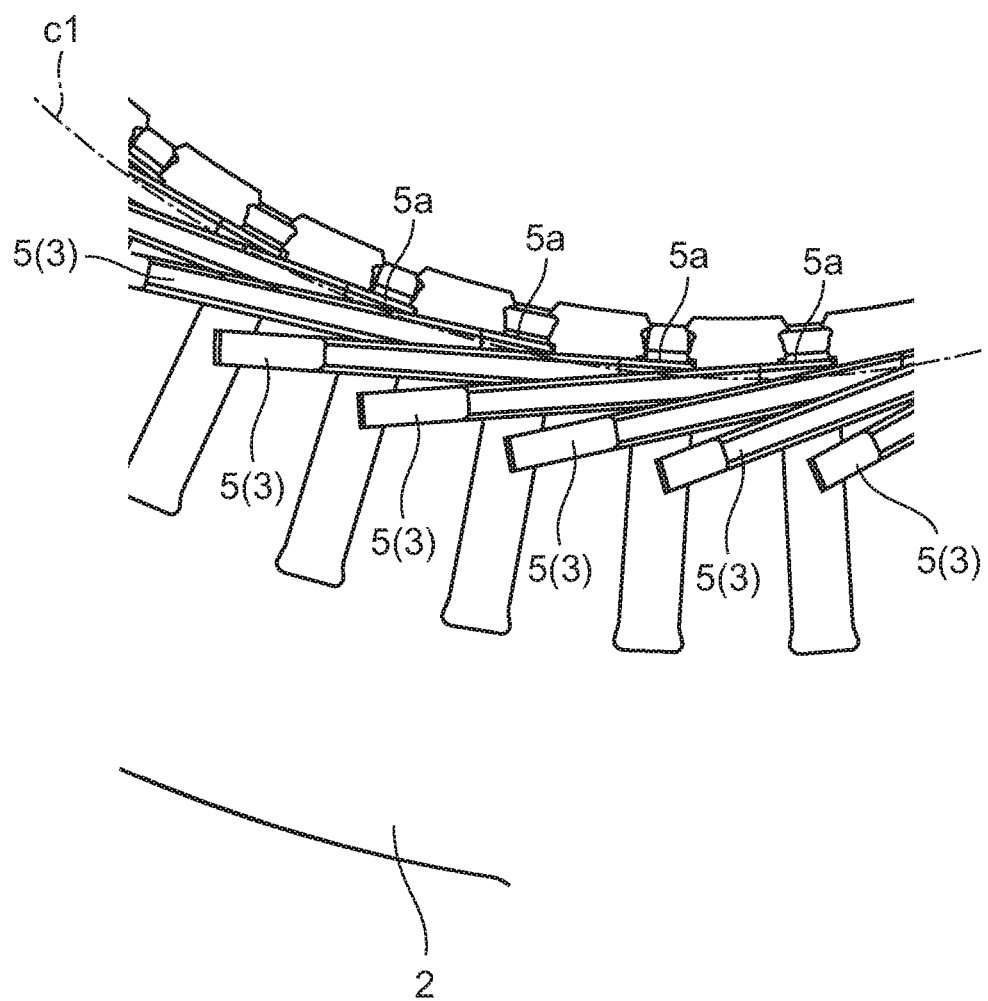
FIG. 18 is a plan view of the coil ends pushed down in the tangential direction.

FIGS. 17 and 18 illustrate the plurality of coil ends 5 arranged on the first round and pushed down clockwise in a plan view. As illustrated in FIG. 7, the guiding slits 10 extend so as to be inclined with respect to the circumferential direction when viewed from the axial direction of the stator core 2. Accordingly, when the drive plate 9 is rotated clockwise relative to the guide plate 7, the bending teeth 14 move clockwise and also move toward an outer periphery. On this account, as illustrated in FIGS. 17, 18, the coil ends 5 are not pushed down along the circumferential direction, but pushed down slightly toward the outer peripheral side.

More specifically, a direction in which the coil ends 5 are pushed down is the tangential direction with respect to the circle c1 on which the bases 5a of the plurality of coil ends 5 are arranged, when viewed in the axial direction of the stator core 2, as illustrated in FIG. 18. That is, when viewed from the axial direction of the stator core 2, the coil ends 5 pass the bases 5a and are pushed down to extend in the tangential direction with respect to the circle c1. As such, since the coil ends 5 adjacent to each other are not pushed down along the same direction and the coil ends 5 are pushed down slightly toward the outer peripheral side, it is possible to restrain unexpected physical interference between the bending teeth 14 and the coil ends 5 at the time when the coil ends 5 are pushed down.

Figure 19:
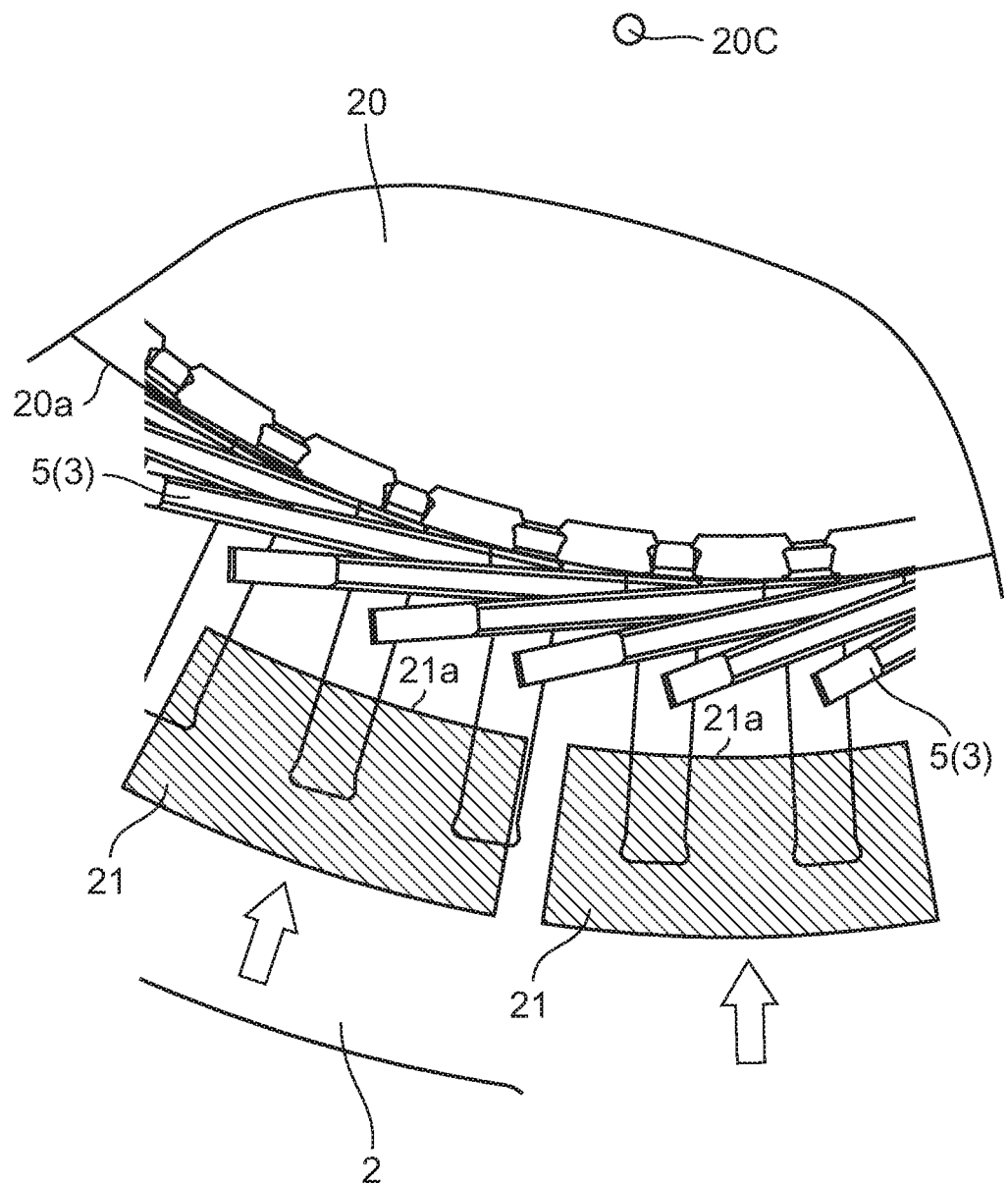
FIG. 19 is a plan view of the coil ends pushed down in the tangential direction.

Subsequently, as illustrated in FIG. 19, a restraint member 20 is inserted on the inner peripheral side relative to the plurality of coil ends 5 on the first round (S330). The restraint member 20 has a round-shaped outer peripheral portion in a section perpendicular to the axial direction of the stator core 2. Specifically, the restraint member 20 is formed in a ring shape. The outer peripheral portion of the restraint member 20 has an outer peripheral surface 20a. The restraint member 20 is placed on the inner peripheral side (a radially inner side) of the stator core 2 relative to the plurality of coil segments 3 placed concentrically. The outer peripheral surface 20a of the restraint member 20 is placed on the inner peripheral side (the radially inner side) of the stator core 2 relative to the plurality of coil segments 3 placed concentrically. The outer peripheral surface 20a of the restraint member 20 is opposed to the plurality of coil ends 5 in the radial direction of the stator core 2. The restraint member 20 is inserted on the inner peripheral side of the stator core 2 so that a central axis 20C of the restraint member 20 accords with a central axis 2C of the stator core 2.

Subsequently, the plurality of coil ends 5 is pushed toward the inner peripheral side by use of a plurality of pressing jigs 21 so that the plurality of coil ends 5 thus pushed down toward the outer peripheral side is arranged along the circumferential direction (S340). Similarly to the outer peripheral surface 20a of the restraint member 20, a pressing surface 21a, which is an inner peripheral surface of the pressing jig 21, curves slightly so as to project toward the outer peripheral side. The plurality of coil ends 5 is pushed toward the inner peripheral side by the pressing surfaces 21a of the pressing jig 21, so that the plurality of coil ends 5 is sandwiched, in the radial direction of the stator core 2, between the outer peripheral surface 20a of the restraint member 20 and the pressing surface 21a of the pressing jig 21. Hereby, the plurality of coil ends 5 curves slightly so as to project toward the outer peripheral side and extends along the circumferential direction.

Subsequently, a plurality of coil segments 3 on the second round (S350) is inserted into the plurality of coil slots 4 of the stator core 2, respectively (S360).

Then, similarly to the plurality of coil ends 5 on the first round, the plurality of coil ends 5 on the second round is pushed down toward the outer peripheral sides (S370). Note that the plurality of coil ends 5 on the second round is pushed down counterclockwise. A coil end bending jig 6 used at this time is to push down the plurality of coil ends 5 on the second round counterclockwise. On this account, the coil end bending jig 6 used herein is configured to be horizontally inverted from a configuration of the coil end bending jig 6 used to push down the plurality of coil ends 5 on the first round toward the outer peripheral side is used.

Then, similarly to the plurality of coil ends 5 on the first round, the plurality of coil ends 5 on the second round is pushed toward the inner peripheral sides (S380).

Steps S360 to S380 are executed on a plurality of coil segments 3 on the third to eighth rounds in the same manner (S390, S400).

Note that, in order to push down the plurality of coil segments 3 on the second round, respective starting positions of the holding beams 12 in their corresponding guiding slits 10 at the time of moving the bending teeth 14 are slightly on the outer peripheral side, in comparison with starting positions thereof at the time of moving the bending teeth 14 so as to push down the plurality of coil segments 3 on the first round. The same can be said about the third or later rounds.

Finally, the restraint member 20 is removed from the stator core 2 (S410), and the plurality of coil ends 5 is joined to each other appropriately. Hereby, a coil is formed.

A preferred embodiment has been described above, but the above embodiment has the following features.

The coil end bending method of pushing down the plurality of coil ends 5 of the coil segments 3 held by the stator core 2 by use of the coil end bending jig 6, the plurality of coil ends 5 being arranged on the same circumference (the circle c1), includes: a first step (S320) of pushing down the plurality of coil ends 5 toward the outer peripheral side; and a second step (S340) of pushing the plurality of coil ends 5 toward the inner peripheral side so that the plurality of coil ends 5 thus pushed down toward the outer peripheral side is along the circumferential direction. According to the above method, at the time when the plurality of coil ends 5 arranged on the same circumference (the circle c1) is pushed down in the circumferential direction, the coil ends 5 adjacent to each other are not pushed down along the same direction, in comparison with a case where a plurality of coil ends 5 is pushed down by one step along the circumferential direction. This accordingly makes it possible to restrain unexpected physical interference between the coil end bending jig 6 and the coil ends 5.

Further, in the first step (S320), a direction to push down the coil ends 5 is the tangential direction with respect to the circle c1 on which the plurality of coil ends 5 is arranged, when viewed from the axial direction of the stator core 2. According to the above method, it is possible to simplify the second step (S340) of pushing the plurality of coil ends 5 toward the inner peripheral side.

Note that the direction to push down the plurality of coil ends 5 in the first step (S320) is not limited to the above tangential direction, and the plurality of coil ends 5 may be pushed down in the radial direction of the stator core 2, for example.

Further, before the second step (S340), the restraint member 20 having a ring shape and having the outer peripheral surface 20a is inserted in advance on the inner peripheral side of the stator core 2 relative to the plurality of coil ends 5 so that the outer peripheral surface 20a is opposed to the plurality of coil ends 5 in the radial direction of the stator core 2 and the central axis 20C of the restraint member 20 accords with the central axis 2C of the stator core 2. In the second step (S340), the plurality of coil ends 5 is pressed against the outer peripheral surface 20a of the restraint member 20. According to the above method, in the second step (S340), the plurality of coil ends 5 is not excessively pushed toward the inner peripheral side.

Note that the restraint member 20 can be omitted. Further, when the coil ends 5 are pressed against the outer peripheral surface 20a of the restraint member 20, a moderate curve that projects toward the outer peripheral side is formed in each of the coil ends 5.

Further, in the coil segments 3 held by the toric stator core 2, the coil end bending jig 6 that pushes down the plurality of coil ends 5 arranged on the same circumference (the circle c1) includes: a plurality of bending units 8 each having a bending tooth 14 that can make contact with a corresponding coil end 5, and a guide plate 7 (a guide member) having a plurality of guiding slits 10 into which the plurality of bending units 8 is inserted, respectively. The plurality of guiding slits 10 extends along the tangential direction with respect to the circle c1 on which the plurality of coil ends 5 is arranged, when viewed from the axial direction of the stator core 2. According to the above configuration, the coil ends 5 adjacent to each other are not pushed down along the same direction at the time when the plurality of coil ends 5 arranged on the same circumference (the circle c1) is pushed down. This accordingly makes it possible to restrain unexpected physical interference between the coil end bending jig 6 and the coil ends 5.

The above embodiment can be modified as follows.

In the present embodiment, the guiding slits 10 extend along a tangential direction with respect to the circle on which the plurality of coil ends 5 is arranged, when viewed from the axial direction of the stator core 2. However, the guiding slits 10 are not limited to the embodiment. For example, the guiding slits 10 may extend in a curve or linearly from the inner peripheral side of the stator core 2 to the outer peripheral side of the stator core 2 so as not to intersect with each other when viewed from an axial direction of the stator core 2.

Further, in the present embodiment, the coil segments 3 extend linearly before the coil segments 3 are inserted into the coil slots 4 of the stator core 2. However, instead of this, two coil segments 3 may be inserted into each of the coil slots 4 of the stator core 2 in a state where the two coil segments 3 are connected in a U-shape.

Further, in the present embodiment, the coil segment 3 extends linearly before the coil segment 3 is inserted into the coil slot 4 of the stator core 2. In this case, the coil segment 3 has two coil ends 5. Both of the coil ends 5 are once pushed down toward the outer peripheral side, and then bent so as to be pushed toward the inner peripheral side. This accordingly makes it possible to restrain unexpected physical interference between the coil end bending jig 6 and the coil ends 5.

Further, the coil end bending jig 6 may not be moved axially at the time when the plurality of coil ends 5 is pushed down.

What is claimed is:

1. A coil end bending jig comprising:
   a plurality of bending units each having a bending tooth making contact with a corresponding one of a plurality of coil ends of a plurality of coil segments held by a toric stator core, the plurality of coil ends being arranged on a first circumference; and
   a guide member having a plurality of guiding slits into which the plurality of bending units is inserted, respectively, the plurality of guiding slits extending from an inner peripheral side of the stator core to an outer peripheral side of the stator core so as not to intersect with each other when viewed from an axial direction of the stator core.

2. The coil end bending jig according to claim 1, wherein the guiding slits extend linearly when viewed from the axial direction of the stator core.

3. The coil end bending jig according to claim 2, wherein the guiding slits extend along a tangential direction with respect to a circle on which the plurality of coil ends is arranged, when viewed from the axial direction of the stator core.

4. The coil end bending jig according to claim 1, further comprising:
a drive plate including a plurality of driving slits arranged on a second circumference, and a through-hole provided in a center of the drive plate, the drive plate being rotatable relative to the guide member, wherein:
the bending unit includes a driving beam extending in a direction perpendicular to the bending tooth, a holding beam projecting from one end portion of the driving beam so as to hold the bending tooth, and a cam follower projecting from the other end portion of the driving beam in a direction opposite to a direction where the holding beam projects; and
the cam follower is inserted into a corresponding one of the driving slits.

5. A method for bending coil ends by use of a coil end bending jig which includes a plurality of bending units and a guide member having a plurality of guiding slits into which the plurality of bending units is inserted, respectively, the method comprising:
pushing down with the jig a plurality of coil ends of a plurality of coil segments held by a toric stator core toward an outer peripheral side of the stator core; and
pushing the plurality of coil ends toward an inner peripheral side of the stator core so that the plurality of coil ends is pushed down toward an outer peripheral side of the stator core along a circumference direction of the stator core.

6. The method according to claim 5, further comprising:
inserting a restraint member on the inner peripheral side of the stator core relative to the plurality of coil ends in advance before pushing the plurality of coil ends toward the inner peripheral side of the stator core, so that an outer peripheral surface of the restraint member is opposed to the plurality of coil ends in a radial direction of the stator core and a central axis of the restraint member matches with a central axis of the stator core, the restraint member having a round-shaped outer peripheral portion in a section perpendicular to the axial direction of the stator core, wherein
when the plurality of coil ends is pushed toward the inner peripheral side of the stator core, the plurality of coil ends is pressed against the outer peripheral surface of the restraint member.

7. A coil end bending jig comprising:
a plurality of bending units each having a bending tooth making contact with a corresponding one of a plurality of coil ends of a plurality of coil segments held by a toric stator core, the plurality of coil ends being arranged on a same circumference; and
a guide member having a plurality of guiding slits into which the plurality of bending units is inserted, respectively, the guiding slits extending along a tangential direction with respect to a circle on which the plurality of coil ends is arranged, when viewed from an axial direction of the stator core.

* * * * *

UNITED STATES PATENT AND TRADEMARK OFFICE
CERTIFICATE OF CORRECTION

PATENT NO. : 10,361,611 B2
APPLICATION NO. : 15/298343
DATED : July 23, 2019
INVENTOR(S) : Yasuyuki Hirao Page 1 of 1

It is certified that error appears in the above-identified patent and that said Letters Patent is hereby corrected as shown below:

On the Title Page

Item (73), the Assignee's information is incorrect. Item (73) should read:
-- (73) Assignee: TOYOTA JIDOSHA KABUSHIKI KAISHA, Toyota-shi (JP) --

Signed and Sealed this
Nineteenth Day of November, 2019

Andrei Iancu
*Director of the United States Patent and Trademark Office*